(12) United States Patent
Gabel et al.

(10) Patent No.: US 8,020,577 B1
(45) Date of Patent: *Sep. 20, 2011

(54) RUPTURE DISC ASSEMBLY FOR PNEUMATIC PLUGS

(75) Inventors: Brent L. Gabel, Fridley, MN (US); David A. Endresen, Brooklyn Center, MN (US); Mark C. Bjorlin, Victoria, MN (US)

(73) Assignee: Cherne Industries Incorporated, Minneapolis, MN (US)

( * ) Notice: Subject to any disclaimer, the term of this patent is extended or adjusted under 35 U.S.C. 154(b) by 458 days.

This patent is subject to a terminal disclaimer.

(21) Appl. No.: 12/009,538

(22) Filed: Jan. 21, 2008

Related U.S. Application Data

(60) Provisional application No. 60/963,138, filed on Aug. 2, 2007.

(51) Int. Cl.
F16K 17/16 (2006.01)
(52) U.S. Cl. ....................................... 137/68.23; 138/93
(58) Field of Classification Search .............. 137/68.19, 137/68.23, 68.21; 138/93; 220/89.2, 89.4
See application file for complete search history.

(56) References Cited

U.S. PATENT DOCUMENTS

| | | | | |
|---|---|---|---|---|
| 328,008 A * | 10/1885 | Matthews, Jr. | ............... | 220/89.2 |
| 1,606,831 A * | 11/1926 | Ford | ............................. | 220/89.2 |
| 2,370,870 A * | 3/1945 | Mckeague | .................... | 220/89.2 |
| 2,506,074 A * | 5/1950 | Fawkes | ......................... | 251/240 |
| 2,701,075 A * | 2/1955 | Coffman | ....................... | 220/89.2 |
| 2,922,544 A | 1/1960 | Hibbard et al. | | |
| 2,952,383 A | 9/1960 | Paxton et al. | | |
| 4,102,469 A * | 7/1978 | Shegrud et al. | ............. | 220/89.2 |
| 4,219,040 A * | 8/1980 | Fallon et al. | .............. | 137/68.23 |
| 5,718,288 A | 2/1998 | Bertet et al. | | |
| 6,230,733 B1 * | 5/2001 | Strelow et al. | ............. | 137/68.23 |
| 7,325,574 B1 | 2/2008 | Beckey | | |

* cited by examiner

*Primary Examiner* — Stephen M Hepperle
*Assistant Examiner* — Macade Brown
(74) *Attorney, Agent, or Firm* — Eggink & Eggink; Anthony G. Eggink; Katrina M. Eggink

(57) ABSTRACT

A rupture disc assembly for pneumatic plugs constructed and arranged to cooperate with an aperture in an end casting or other plug component to expel excess air from the plug interior when a predetermined internal plug pressure is reached. The rupture disc holder assembly may have a two part body structure and be mounted to the inside or outside of the pneumatic plug. The rupture disc assembly utilizes a rupturable member in a flanged holder structure positioned in communication with the pneumatic plug.

16 Claims, 5 Drawing Sheets

RUPTURE DISC ASSEMBLY FOR PNEUMATIC PLUGS

This application claims the benefit of U.S. Provisional Patent Application Ser. No. 60/963,138, filed on Aug. 2, 2007, and which is incorporated by reference herein.

BACKGROUND OF THE INVENTION

This invention relates generally to a rupture disc assembly to vent pressure from an inflatable system. Particularly, the invention relates to a rupture disc assembly for use with pneumatic pipeline plugs to vent air at a predetermined internal plug pressure to thereby prevent overinflation of the pneumatic plug.

Pneumatic plugs are constructed to be inflated to a desired pressure and any undue excess pressure may cause damage to the plug and cause possible injury to the user and surroundings. A long felt need exists in the pipe plug art to relieve excess pressure at a specified pressure reading. In the past, the alternatives have primarily been read-back pressure gauges and pressure relief valves, however, both the reliance on pressure gauges and on pressure relief valves have not been adequate.

Read back pressure gauges are typically not sufficient because they may be broken and/or out of calibration and do not inherently prevent over inflation. Read back gauges also require operator intervention and therefore, are limited in their effectiveness to prevent pneumatic plug overinflation.

Pressure relief valves have also been found to not be particularly suited for pneumatic pipe plug applications because they typically were unable to bypass sufficient fluid flow once they start to open. One reason for this is that the spring-loaded steel ball used to seal the valve unit blocks the air flow once it starts to open, thus, drastically reducing the air flow for a given orifice diameter. The pressure relief valve, therefore, does not effectively allow large airflows until high pressure differentials are achieved, i.e., the steel ball is completely pushed out of the way of the air flow. There is a need to bypass large flow values at low pressure differentials as opposed to high pressure differentials.

A further reason pressure relief valves are not suitable for use in inflatable pipe plugs is that such relief valves are subject to leakage due to contamination of the valve seal. The application of using inflatable plugs is often very dirty and debris is very likely to get into the sealing area and cause the valve to leak slowly, ultimately causing the plug to dislodge from the pipeline, and potentially causing damage and injury. Thus, a need exists in the pneumatic pipeline sealing plug art to provide a reliable means to prevent over inflation.

The rupture disc assembly of the present invention prevents overinflation of inflatable sewer plugs by utilizing a disc or like structure that is constructed to rupture at a specified pressure which is below the ultimate burst pressure of the plug. The resultant opening in the ruptured disc and holder structure is of sufficient size to bypass the air coming from the compressor used to inflate the plug so that the ultimate burst pressure of the plug is not reached.

The utilization of a rupture disc assembly overcomes the shortcomings of the pressure relief valves of the prior art. When the disc ruptures, the large orifice created is capable to bypass large quantities of air much more efficiently than a pressure relief valve.

Applicants' assignee is the owner by assignment of copending U.S. patent application Ser. No. 11/103,084, filed on Apr. 11, 2005, now U.S. Pat. No. 7,325,574, issued on Feb. 5, 2008 for a rupture disc assembly which is incorporated by reference herinto.

The rupture disc holders of the present invention may be constructed and arranged to be mounted on either the inside or outside of the pneumatic plug body structure. The rupture disc holder may, for example, be mounted on the outside of a pneumatic plug and may be adapted to be threadingly mounted to the end plate of the pneumatic plug structure or to a threaded structure mounted to the end plate to provide servicing access. The rupture disc structure may also be incorporated into the structure of the end plate or to a structure that may be mounted to the end plate and which is in communication with the pneumatic plug.

SUMMARY OF THE INVENTION

The present invention provides a vent rupture disc assembly for pneumatic plugs. The rupture disc assembly of the invention may be mounted on 15-30" plug end castings, for example. The rupture disc assembly may be provided in several embodiments. The assembly includes a disc holder body having a flanged structure for holding a rupturable disc. The disc holder body may be internally flanged to hold a rupturable disc in a sealed state. The holder body is constructed and arranged to communicate with the interior of the pipeline plug. In one embodiment the assembly is provided on the interior of the plug body and is constructed and arranged to cooperate with an end casting of the plug. In another embodiment the rupture disc assembly is provided on the exterior of the plug body and is constructed and arranged to cooperate with the inflation port of an end casting of the plug. The rupture disc assembly is preferably mounted in the pneumatic plug in a tamper resistant manner so that once ruptured the plug can no longer be utilized.

Pneumatic plugs typically have a safety factor of at least twice the required inflation pressure, for example. The ultimate burst pressure therefore is greater than twice the required inflation pressure. The rupture disc of the invention is preferably set to rupture at approximately 90% of twice the required inflation pressure. This setting is to prevent nuisance ruptures from slight overinflation due to gauge inaccuracies and testing in vacuum conditions. For example, a 24-48" pneumatic plug may have a required inflation pressure of 22 psi, for example. With a safety factor, this plug's ultimate burst pressure would be greater than 44 psi. The rupture disc is preferably set to rupture at 40 psi (0.9×2×22 psi=40 psi), for example.

The rupture disc may be constructed of a wafer-like structure that is held in an internally flanged holder structure that is positioned adjacent to an aperture in the plug end casting. The disc wafer like structure may be constructed of a graphite composition or other rupturable material. The disc structure may be machined to have a uniform or a varying thickness configuration, i.e., different thicknesses between the central portion and the periphery or a disc structure tapering inward from the periphery from ¼ to ¹⁄₁₆ inches so that the disc bursts at a predetermined pressure. The cross-sectional thickness may be varied, for example, to provide a rupturable structure at a predetermined pressure. Alternatively, the disc structure may be constructed of a rigid material having scored areas such as scored lines designed for rupture at a predetermined pressure. The disc structure may also have a flat or a concave cross-sectional configuration. The rupture disc may be provided in a disc holder body structure having an internally flanged portion which is constructed and arranged to be mounted to the end casting of the pneumatic plug. The rupture disc is positioned in the holder structure so that it does not leak until it ruptures. A rubber O-ring positioned between the rupture disc and the metal disc holder may be provided for an air-tight seal.

In a second embodiment, the inflation air may enter through the inflator of the crow's foot and goes directly into the plug. If the pressure exceeds the specified pressure, the disc ruptures and the compressor airflow is bypassed out the side of the holder device through an orifice to the atmosphere. Tamper-proof bolts and an elongated cover may be used to prevent the disc from rotating so that the device cannot be removed from the plug.

In another embodiment, a rupture disc holder assembly may be constructed and arranged for mounting to the outside of an end plate of a pneumatic plug. The rupture disc holder assembly is comprised of inlet holder member, an outlet plug and a rupture disc held between the inlet holder member and the outlet plug. The two part body structure of the rupture disc holder is constructed to be easily mounted, removed and serviced.

The inlet holder member has an internally threaded top portion defining a cavity and having a centrally disposed bore therethrough. The internally threaded top portion has a flange or annular ledge upon which the rupture disc is placed. The outlet plug is externally threaded to engage the internal threads of the top portion of the inlet holder member to thereby hold the rupture disc therebetween. An O-ring may be interposed between the rupture disc and the annular ledge.

The outlet plug has a centrally disposed bore which aligns with the bore outlet of the inlet holder member. Importantly, the outlet plug is a unitary structure having a cap portion to form a closed end with at least one outlet bore which communicates with the centrally disposed bore and which permits the escape of pressurized fluid from the pneumatics plug upon the rupture of the rupture disc. The closed end cap portion protects the rupture disc during use of the pneumatic plug. The rupture disc holder of the invention is mounted on the exterior of the plug which allows for easy access, maintenance and replacement.

In another embodiment, the rupture disc structure is incorporated into the structure of an access or cover plate which is mounted to the plug end plate. In yet another embodiment the rupture disc structure is mounted to a collar which is in communication with the bypass structure of a pneumatic plug.

These and other benefits of this invention will become clear from the following description by reference to the drawings which show exemplary structures in accordance with the teachings of the invention.

DESCRIPTION OF THE PREFERRED EMBODIMENTS

Figure 1:
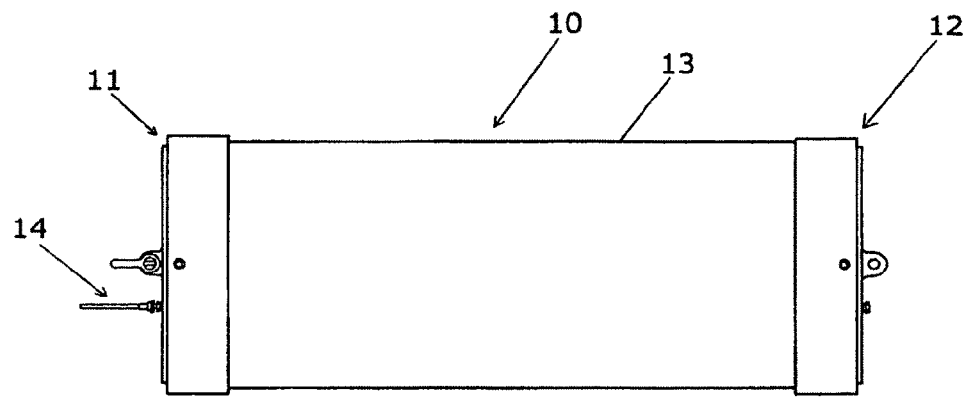
FIG. 1 is a lateral plan view of a pneumatic pipeline plug having end castings and a flexible sleeve structure.
Figure 2:
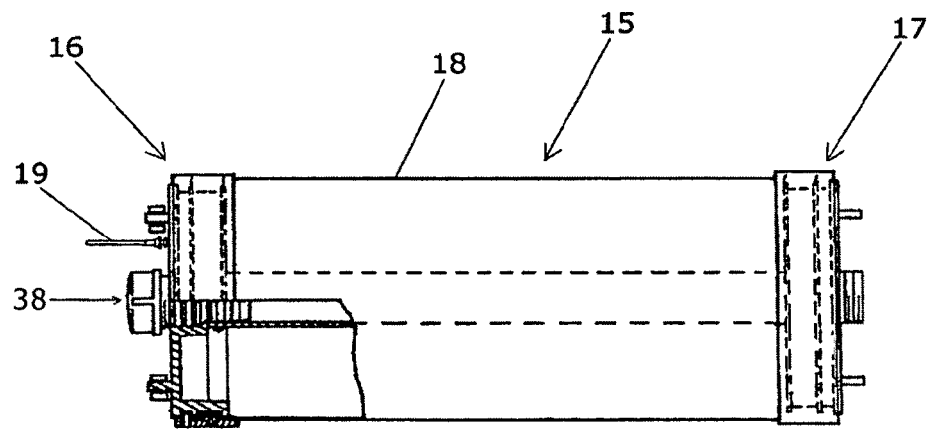
FIG. 2 is a lateral plan view of a pneumatic plug having a by-pass conduit.

FIGS. 1 and 2 are lateral views showing pneumatic pipeline plugs 10 and 15 used to seal pipelines. The rupture disc assemblies of the present invention are constructed and arranged to be utilized in connection with pneumatic plugs and which are generally designated as plugs 10 and 15. The pneumatic plug 10 may typically have rigid end structures or end castings 11 and 12 which hold a flexible elastomeric sleeve 13 therebetween. Plugs 10 and 15 are exemplary showings of pneumatic plugs and do not specifically show the end castings shown in the subsequent drawing figures. Pneumatic plug 15 is shown to have end castings 16 and 17 and between which elastomeric sleeve 18 is held. Inflator 14 extends from and end casting 11 and is used to inflate and deflate the plug 10. The plug 15 is shown to have a by-pass conduit 29. Inflator 19 is shown extending from end casting 16. The rigid end structures such as end castings 16 and 17 ma be referred to as end castings or end slates. For example, in FIG. 6, the rigid end structure is referred to as an end casting 43, in FIGS. 9 and 10, the rigid end structure is referred to as an end casting 54 and in FIG. 11, the rigid end structure is referred to as casting 58.

Figure 3:
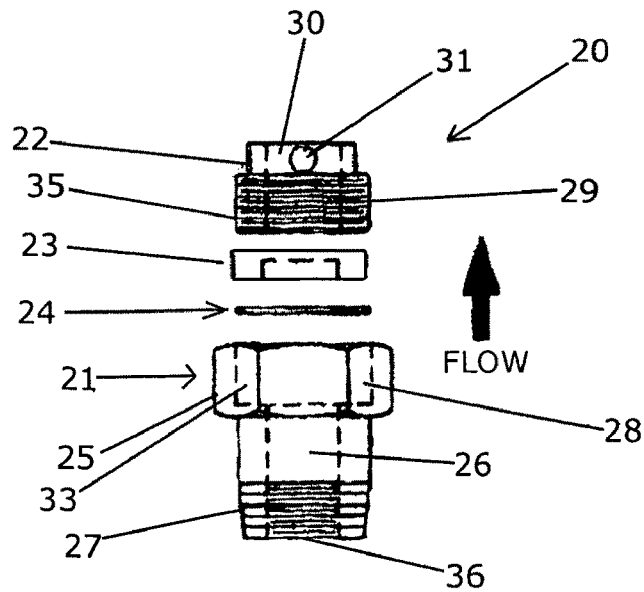
FIG. 3 is a lateral plan view of the rupture disc assembly of the invention.

Referring to FIG. 3, rupture disc holder assembly 20 is shown comprised of an inlet holder member 21 and an outlet plug 22 which are threaded together to hold a rupture disc 23 and O-ring 24. Although the specific structural aspects of the assembly are exemplary, the inlet holder member 21 is shown to have a tapered threaded bottom end 26 with threads 27 and an internally threaded top portion 25 which is hexagonal in shape and has an internally disposed cylindrical cavity 28. The internal cavity 28 forms an annular ledge disposed about bore 36. The internal cavity has internal threads 33 about the cavity wall periphery. The tapered threaded bottom end 26 engages the threaded bore in the end plate of a pipeline plug as shown in Applicants' Assignee's pending '084 Patent Application. Although various cooperating internally and externally threaded engagements are shown and discussed herein, it is within the purview of the invention to enable the use of oppositely disposed and cooperating threaded structures, e.g., external instead of internal threads, and internal instead of external threads or similar adjustable engagement means.

The outlet plug 22 is shown to have a bottom threaded portion 29 which engage and cooperate with the internally threaded cylindrical cavity 28 of top portion 33 of the inlet holder member 21. The outlet plug 22 is shown having a centrally disposed bore 35. The top portion 30 of the outlet plug 22 is shown to have a bore 31 which is perpendicularly disposed and in communication with the bore 35 in the outlet plug 22. Although one bore 31 is shown in top portion 30, preferably a plurality of such bores, (e.g., five or six) radiating outwardly from the central bore 35 are utilized to provide sufficient volumetric fluid flow upon disc 23 breakage. For example, a total area of flow through bore(s) 31 at least equal to the bore 35 area is desired.

Figure 9:
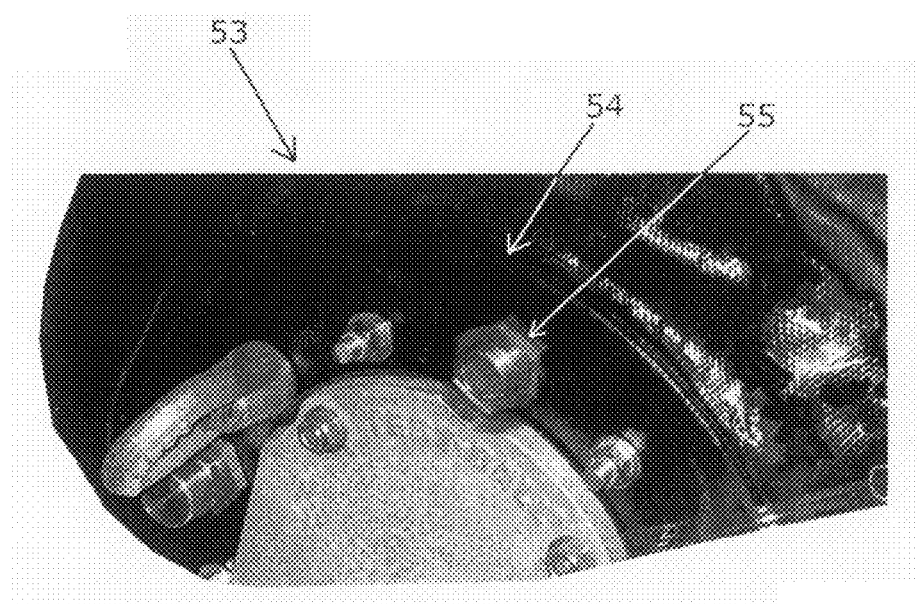
FIG. 9 is a perspective view of a nipple structure on the end casting of a pneumatic plug.

Regarding the inlet holder member 21, although the cylindrical shaft portion 26 is shown to be a straight structure emanating downward from the hexagonal portion 25 of the inlet holder member 21, it is within the purview of the invention to utilize a bent or angled structure, e.g., at 90 degrees, so that the overall structure is disposed generally parallel the pneumatic plug end plate. As shown in FIG. 9, the end plate may be provided with a threaded nipple structure to which the rupture disc holder may be mounted. The nipple structure may have an externally threaded end whereby the threads 27 are a female thread arrangement, e.g., female NPT threads. This rupture disc assembly is shown mounted to a nipple structure in FIG. 10.

Figure 4:
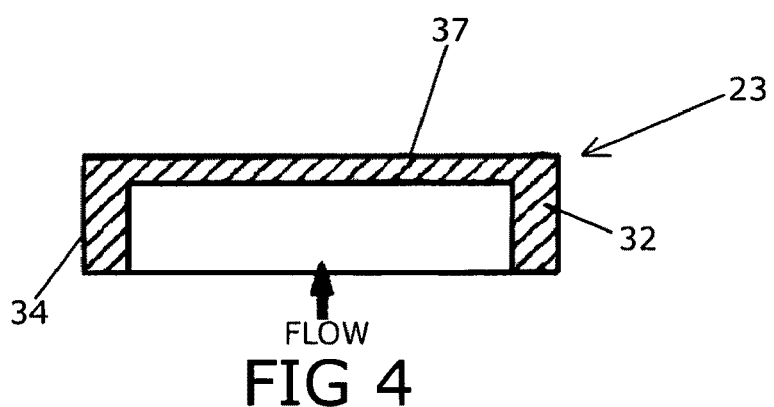
FIG. 4 is a sectional view of the rupture disc of FIG. 3.
Figure 5:
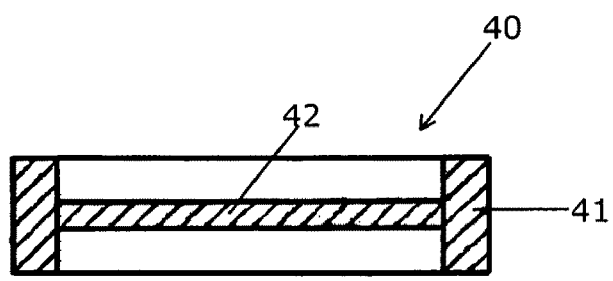
FIG. 5 is a sectional view of another embodiment of a rupture disc.

FIG. 4 is an enlarged view showing the rupture disc 23 having a circular body structure having a thickened periphery 32 and a relatively thinner center area 37. An informational sticker 34 may be placed on the outside wall of the periphery 32 to show air flow direction and to provide a burst rating, for example. The air flow arrow shows that air from the plug is in contact with the inverted U-shaped portion of the rupture disc 23. Alternatively, as shown in FIG. 5, the rupture disc 40 may have a cross-sectional structure wherein the central area 42 is disposed generally midway the thickness of the peripheral wall 41 of the rupture disc so that the rupture disc 40 may be disposed in either direction within the rupture disc assembly. In the latter embodiment the informational sticker may be omitted or positioned on the exterior of the assembly, for example.

As shown in FIG. 3, rupture disc 23, i.e., a disc constructed of a rupturable material, such as graphite or a scored metal or plastic disc structure, is positioned in the holder body. Although FIGS. 3 and 4 show one rupture disc structure, the graphite disc may have a concave cross-sectional configuration having a varying thickness, i.e., from ¼ to 1/16 inches from the periphery to the center, for example. A rigid disc structure having scored or weakened areas or lines may also be utilized. For example, metallic or polymeric discs having scored lines and a flat or curved, i.e., concave or domed structure may be used within the purview of the invention.

Referring to FIGS. 3 and 4, the rupture disc holder 20 may have any necessary dimensions as required for use. An exemplary structure is discussed above, for example. The inlet holder member 21 and outlet plug 22 may be formed of Aluminum or like material and the rupture disc 23 may be formed of graphite or the like and the O-ring 24 may be formed of Buna rubber or like material. The latter dimensions and compositions are exemplary.

Fluid flow arrows are shown adjacent the assembly of FIG. 3 and the rupture disc structure of FIG. 4. In use the tapered threads 27 of the cylindrical shaft portion 26 of the inlet holder 21 are threaded into an internally threaded end plate of a pneumatic plug by means of a wrench engaging the hexagonal portion 25 of the inlet holder member 21. Should the internal pressure of the pneumatic plug exceed the burst pressure of disc 23 the pressurized air escapes through the ruptured central portion 37 of the disc 23, through bore 35 and out bore(s) 31 in end cap 30. The end cap 30 provides protection for the disc 23 during normal conditions, thereby not requiring a separate barrier or housing structure for protection of the rupture disc holder.

Figure 6:
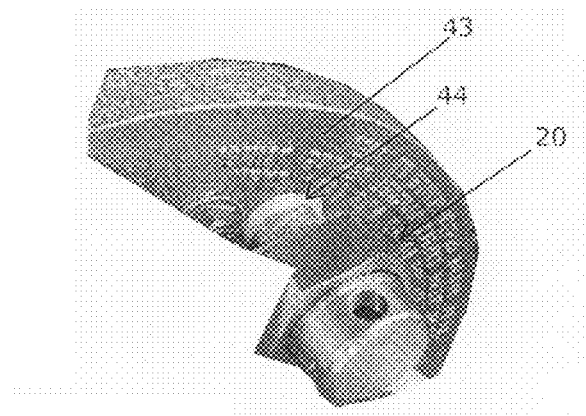
FIG. 6 is a perspective view showing the rupture disc holder mounted to the exterior of a plug end casting.
Figures 7, 8:
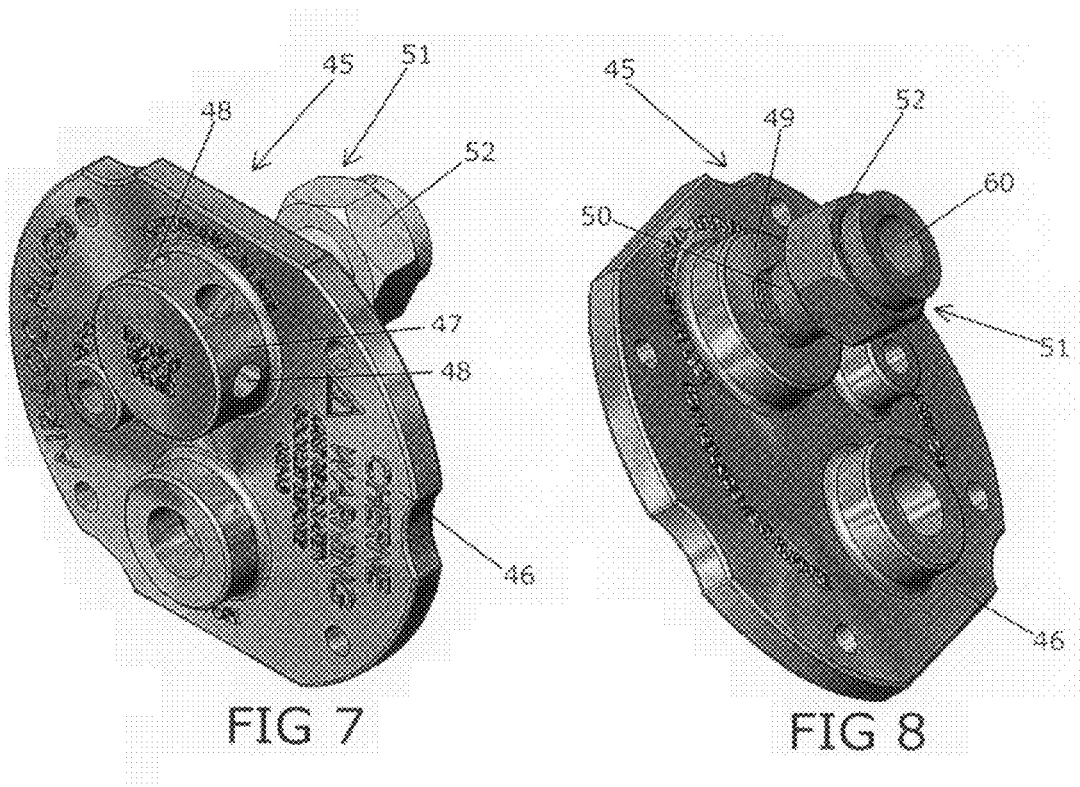
FIG. 7 is a front perspective view of the rupture disc holder incorporated into a cover plate.
FIG. 8 is a rear perspective view of the rupture disc holder and cover plate of FIG. 7.

The rupture disc assemblies of the invention may be mounted to or otherwise incorporated into an end casting of the pneumatic plug. Exemplary rupture disc assemblies are shown in the drawings, for example. FIG. 6 shows a rupture disc assembly 20 threaded in aperture 44 and mounted to the exterior of a pneumatic plug end casting 43 adjacent cover or access plate 61. FIGS. 7 and 8 show a rupture disc assembly which is incorporated into and mounted to a cover or access plate 45 which is attached to and removable from the exterior of the end casting and/or access plate of the pneumatic plug. The rupture disc assemblies operate on generally the same principle in that each assembly cooperates with an aperture in the end casting of the pneumatic plug to expel excess air pressure from the plug interior when a predetermined internal plug pressure is reached.

Referring to FIGS. 7 and 8, a cover or access plate structure 45 is shown incorporating a rupture disc assembly. The cover plate is shown having a generally flat body 46 having a circular protrusion 47 with a plurality of peripheral vent apertures 48. On the back side of body 46 a generally circular bottom protrusion 49 is shown having a threaded shaft or nipple 50. The bore (not shown) through the bottom protrusion 49 communicates through the plate body 46 to the vent apertures 48 on the opposite side. The inlet holder member 51 having the hexagonal portion with the flanged threaded interior (not shown) and bore 60 holds the rupture disc in a manner similar to the rupture disc assembly structures discussed herein. In this embodiment, the rupture disc is positioned on the interior of the plug whereas a portion of the assembly, namely the closed end vent portion of the assembly, is positioned outside the pneumatic plug. The protrusions 47 and 49 may be machined or cast integral the plate body 46 as shown in FIGS. 7 and 8.

Figure 10:
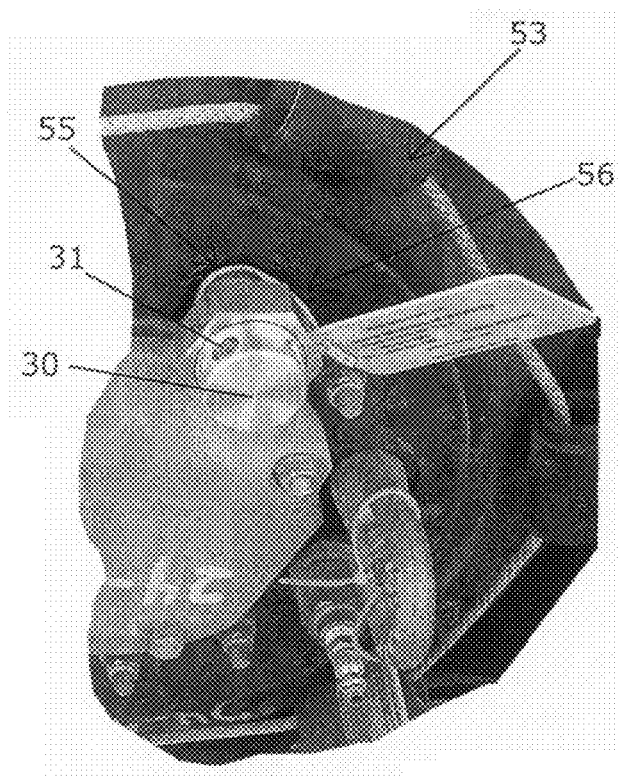
FIG. 10 is a perspective view showing the rupture disc assembly of the present invention mounted to the nipple structure of an end casting of a pneumatic plug.

Referring to FIGS. 9 and 10, a pneumatic plug 53 is shown having an end casting 4 with a nipple structure 55 adjacent cover or access plate 61. Nipple structures are provided for fluid connection purposes and comprise an externally threaded conduit having a top member that may be removed. In FIG. 10, a rupture disc assembly 56 is shown mounted to the male threaded conduit of the nipple structure 55. Essentially, the difference between rupture disc assembly 56 and rupture disc assembly 20 as shown in FIG. 3, is that the cylindrical shaft of the inlet holder is internally threaded or has female threads as opposed to the external or male threads 27 of assembly 20. The assembly 56 allows a user to easily mount a rupture disc assembly to an end casting of a plug having a nipple structure 55.

Figure 11:
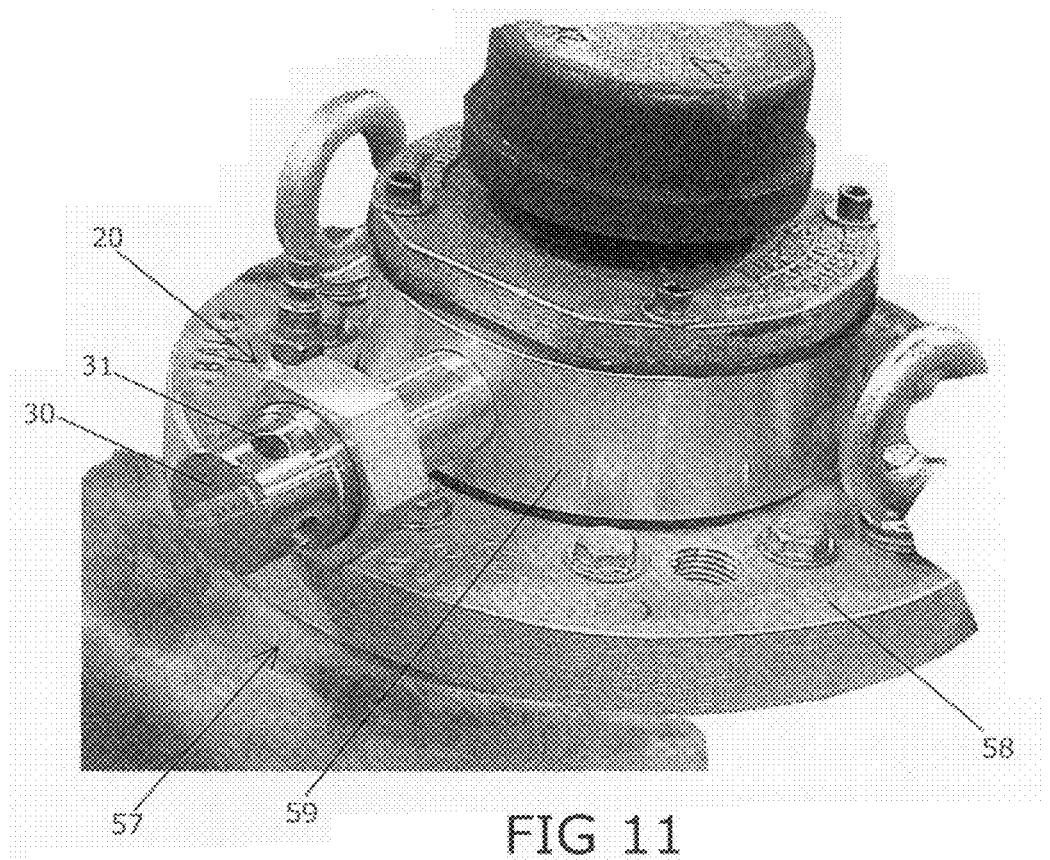
FIG. 11 is a perspective view showing the rupture disc assembly mounted to a collar extending from the end plate of a pneumatic plug.

Referring to FIG. 11, a pneumatic plug 57 and casting 58 is shown having a bypass structure which includes a collar 59. A rupture disc assembly 20 is shown threadingly mounted in an aperture of the collar 59. In this embodiment the assembly is in communication with the plug structure by means of an aperture in the collar structure of the bypass.

In summary, the rupture disc assemblies of the invention are shown constructed and arranged to prevent overinflation of pneumatic or sewer plugs by utilizing a rupture disc, i.e., constructed of a graphite disc structure that ruptures at a specified pressure that is below the ultimate burst pressure of the plug. The resultant opening in the rupture disc, the disc holder and the casting aperture is of sufficient size to expel air from the compressor to the plug so that the ultimate burst pressure of the pneumatic plug is not reached.

As many changes are possible to the embodiments of the rupture disc assemblies of this invention utilizing the teachings thereof, the descriptions above and the accompanying drawings should be interpreted in the illustrative and not in the limited sense.

That which is claimed is:

1. A separable rupture disc assembly for a pneumatic pipeline plug having an end plate comprising:
   a) a disc holder body having an internally flanged cavity and a body end extending therefrom, said disc holder body further having a bore extending from said internal cavity to said disc holder body end;

b) a rupturable disc structure having a periphery and being positioned in said internal cavity of said disc holder body, said periphery of said disc structure resting on said flange;

c) a second body member having a bore therethrough, said bore being aligned with said bore of said disc holder body, said second body member further having means for securement to secure said rupturable disc structure within said internal cavity of said disc holder body, said second body member having a closed terminal end and at least one aperture therethrough in communication with said bore of said second body member for venting pressurized air from the pneumatic plug upon the rupture of said rupturable disc structure; and d) wherein the end plate of the pneumatic pipeline plug has a cover plate and wherein said second body member is incorporated and integral to said cover plate, said cover plate having an exterior surface extending outward below said closed terminal end and said at least one aperture of said second body member, said cover plate further having an interior surface exposing said means for securement whereby said disc holder body is positioned within the pneumatic plug when said cover plate is mounted to the end plate of the pneumatic pipeline plug.

2. The rupture disc assembly of claim 1, wherein said rupturable disc structure is a graphite disc having a central disc portion and a peripheral edge and wherein said central disc portion is thinner than said peripheral edge.

3. The rupture disc assembly of claim 2, wherein said central disc portion of said disc structure, said disc holder body bore and said second body member bore are generally aligned and have generally the same diameter.

4. The rupture disc assembly of claim 3, wherein said internally flanged cavity has a peripheral edge and wherein an O-ring is interposed between said rupturable disc structure and said peripheral edge of said internal cavity of said disc holder body to provide a sealed rupture disc assembly.

5. The rupture disc assembly of claim 1, wherein said internal cavity of said disc holder body is internally threaded and wherein said means for securement of said cylindrical body member comprises external threads.

6. A separable rupture disc assembly for a pneumatic pipeline plug having a flexible body and an end plate comprising:
   a) a disc holder body having an internally flanged cavity and a body end extending therefrom, said disc holder body further having a bore extending from said internally flanged cavity to said disc holder body end, said internally flanged cavity having a peripheral edge and an O-ring structure positioned on said peripheral edge of said internally flanged cavity of said disc holder body;
   b) a rupturable disc structure having a periphery and being positioned in said internally flanged cavity of said rupturable disc holder body, said periphery of said disc structure resting on said O-ring structure on said peripheral edge of said internally flanged cavity;
   c) a second body member having a bore therethrough, said bore being aligned with said bore of said disc holder body, said second body member further having means for securement to secure said rupturable disc structure within said internal cavity of said disc holder body, said second body member having a closed terminal end and at least one aperture therethrough in communication with said bore of said second body member for venting pressurized air from the pneumatic plug upon the rupture of said ruptureable disc structure, said at least one aperture extending outward generally perpendicular said bore of said second body member and being disposed spatially from said terminal end of said second body member; and
   d) wherein the end plate of the pneumatic pipeline plug has a cover plate and a threaded nipple structure, said nipple structure extending from the end plate adjacent said cover plate, said nipple structure being in communication with said flexible body of said pneumatic plug and wherein said body end of said disc holder has internally disposed threading for threading engagement with said threaded nipple structure.

7. The rupture disc assembly of claim 6, wherein said rupturable disc structure has a central disc portion and a peripheral edge and wherein said central disc portion is thinner than said peripheral edge.

8. The rupture disc assembly of claim 7, wherein said central disc portion of said disc structure, said disc holder body bore and said second body member bore are generally aligned and have generally the same diameter.

9. The rupture disc assembly of claim 6, wherein said ruptureable disc structure is comprised of graphite.

10. The rupture disc assembly of claim 7, wherein said central disc portion of said disc is generally uniform and provides a substantially larger area for opening and providing a pressure release area.

11. In a pneumatic pipeline plug having a bypass structure, an end casting and a collar structure with a threaded aperture surrounding the bypass structure, a separable rupture disc assembly comprising:
   a) a disc holder body having an internally flanged cavity and a body end extending therefrom, said disc holder body further having a bore extending from said internal cavity to said disc holder body end;
   b) a rupturable disc structure having a periphery and being positioned in said internal cavity of said disc holder body, said periphery of said disc structure resting on said flange;
   c) a second body member having a bore therethrough, said bore being aligned with said bore of said disc holder body, said second body member further having means for securement to secure said rupturable disc structure within said internal cavity of said disc holder body, said second body member having a closed terminal end and at least one aperture therethrough in communication with said bore of said second body member for venting pressurized air from the pneumatic plug upon the rupture of said ruptureable disc structure; and
   d) wherein said body end of said disc holder body is in threaded communication with said threaded aperture of said collar structure.

12. The rupture disc assembly of claim 11, wherein said rupturable disc structure is a graphite disc having a central disc portion and a peripheral edge and wherein said central disc portion is thinner than said peripheral edge.

13. The rupture disc assembly of claim 12, wherein said central disc portion of said disc structure, said disc holder body bore and said second body member bore are generally aligned and have generally the same diameter.

14. The rupture disc assembly of claim 13, wherein said internally flanged cavity has a peripheral edge and wherein an O-ring is interposed between said rupturable disc structure and said peripheral edge of said internal cavity of said disc holder body to provide a sealed rupture disc assembly.

15. The rupture disc assembly of claim 11, wherein said internal cavity of said disc holder body is internally threaded and wherein said means for securement of said cylindrical body member comprises external threads.

16. The rupture disc assembly of claim 11, wherein said rupturable disc member has a burst pressure of approximately 90% of twice the recommended inflation pressure of the pneumatic plug.

* * * * *